(12) United States Patent
Bendapudi et al.

(10) Patent No.: US 7,721,298 B2
(45) Date of Patent: May 18, 2010

(54) OPERATING SYSTEM PERFORMANCE

(75) Inventors: Perraju Bendapudi, Hyderabad (IN);
Amit Kumar Ghosh, Kolkata (IN);
Rajesh Jalan, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 11/003,934

(22) Filed: Dec. 3, 2004

(65) Prior Publication Data
US 2006/0150203 A1 Jul. 6, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................................... 719/319
(58) Field of Classification Search .................. 719/319
See application file for complete search history.

(56) References Cited

U.S. PATENT DOCUMENTS

| | | | | |
|---|---|---|---|---|
| 5,752,032 A * | 5/1998 | Keller et al. | ............... | 719/311 |
| 5,910,180 A * | 6/1999 | Flory et al. | ............... | 719/321 |
| 6,009,476 A * | 12/1999 | Flory et al. | ............... | 719/324 |
| 6,289,396 B1 * | 9/2001 | Keller et al. | ............... | 719/323 |
| 6,393,495 B1 * | 5/2002 | Flory et al. | ............... | 719/327 |
| 6,988,142 B2 * | 1/2006 | Molnar | ............... | 709/230 |
| 7,043,565 B1 * | 5/2006 | Madden et al. | ............... | 709/250 |
| 2002/0078295 A1 * | 6/2002 | Shaath et al. | ............... | 711/112 |
| 2002/0152331 A1 * | 10/2002 | Wong et al. | ............... | 709/321 |
| 2004/0025165 A1 * | 2/2004 | Desoli et al. | ............... | 719/310 |
| 2004/0199763 A1 * | 10/2004 | Freund | ............... | 713/154 |

OTHER PUBLICATIONS

Gyoung-Bae Kim; Sung-In Jung; Myung-joon Kim, "An overview of operating system for next generation internet server (NGIS)," Oct. 2004, Advanced Communication Technology, The 6th International Conference, vol. 2, pp. 828-832.*

Carpenter et al., "The RTX Real-Time Subsystem for Windows NT", Aug. 1997, USENIX, Proceedings of the USENIX Windows NT Workshop, pp. 1-5.*

Carpenter, Bill et al., "The RTX Real-Time Subsystem for Windows NT," Proceedings of the USENIX Windows NT Workshop USENIX Association, Berkeley, California, 1997.

European Search Report for EP Application No. 05 11 0569, Microsoft Corporation, Dec. 27, 2006.

* cited by examiner

*Primary Examiner*—Hyung S Sough
*Assistant Examiner*—KimbleAnn Verdi
(74) *Attorney, Agent, or Firm*—Perkins Coie LLP

(57) ABSTRACT

Techniques for improving operating system performance are provided. A subsystem of an operating system operates as a kernel mode component, such as a kernel mode driver, instead of operating as a user mode component.

8 Claims, 6 Drawing Sheets

OPERATING SYSTEM PERFORMANCE

TECHNICAL FIELD

The described technology relates generally to operating systems and, more particularly, to improving operating system performance.

BACKGROUND

An operating system performs various tasks relating to a computer system, including managing its hardware and software resources. Hardware resources include processors, primary storage (e.g., memory), secondary storage (e.g., hard disk or optical disk), printers, display adapters, network interface cards, input/output ports, etc. Software resources include application programs, user interfaces, device drivers, network protocol stacks, etc. The operating system manages and coordinates these resources to complete various tasks, such as under the direction of an application program.

Operating systems may complete their tasks in user mode or in kernel mode. When in user mode, components of the operating system generally perform tasks relating to application programs. When in kernel mode, components of the operating system generally perform tasks relating to managing hardware devices, device drivers, the operating system itself, and other tasks not directly relating to application programs.

When an application program or other component operating in user mode performs an action that invokes a component operating in kernel mode, a "context switch" occurs. Similarly, when a processor suspends execution of a process and begins execution of another process, a context switch occurs, which may be termed an inter-process. In various operating systems, processes are containers for one or more threads, and so an inter-process context switch may involve an inter-thread context switch. A context switch involves storing and restoring processor state, and is generally computationally intensive. Thus, context switches can degrade performance of an operating system and application programs.

Operating systems may provide functionality to application programs utilizing subsystems that operate in user mode. A subsystem is an operating system component that implements an operating system's application program interfaces (APIs). User mode subsystems are processes that may invoke functions of a kernel component operating in kernel mode. A kernel component is an operating system component that operates in kernel mode and provides core operating system functions. Thus, when an application calls a method of an operating system API, a subsystem implementing the method may invoke a function of a kernel component that operates in kernel mode. As a result, several context switches could occur. As examples, an inter-process context switch occurs when the application invokes a method of the operating system API, and one or more context switches to kernel mode could occur as the method of the operating system API invokes methods of the kernel. These context switches could cause poor operating system performance. Furthermore, when a user mode component invokes a function of a kernel mode component, the user mode component may send an inter-process communication. Inter-process communications may involve processing overhead that further degrades operating system performance. It would thus be highly desirable to improve operating system performance by reducing context switches and inter-process communications.

DETAILED DESCRIPTION

Techniques for improving operating system performance are provided. In various embodiments, a subsystem of an operating system operates as a kernel mode component, such as a kernel mode driver, instead of operating as a user mode component. By operating in kernel mode, the subsystem avoids context switches when invoking functions of a kernel. Context switches from user mode to kernel mode are reduced because function calls from a subsystem operating in kernel mode to a kernel component would be in kernel mode. Inter-process and inter-thread context switches would be avoided because the subsystem would not be a process operating in user mode. Avoiding context switches may improve performance. As an example, a subsystem implementing a portable operating system interface ("POSIX") that generally operates as a user mode subsystem may be implemented as a kernel mode driver to improve performance of the POSIX subsystem and applications dependent on it.

Figure 1:
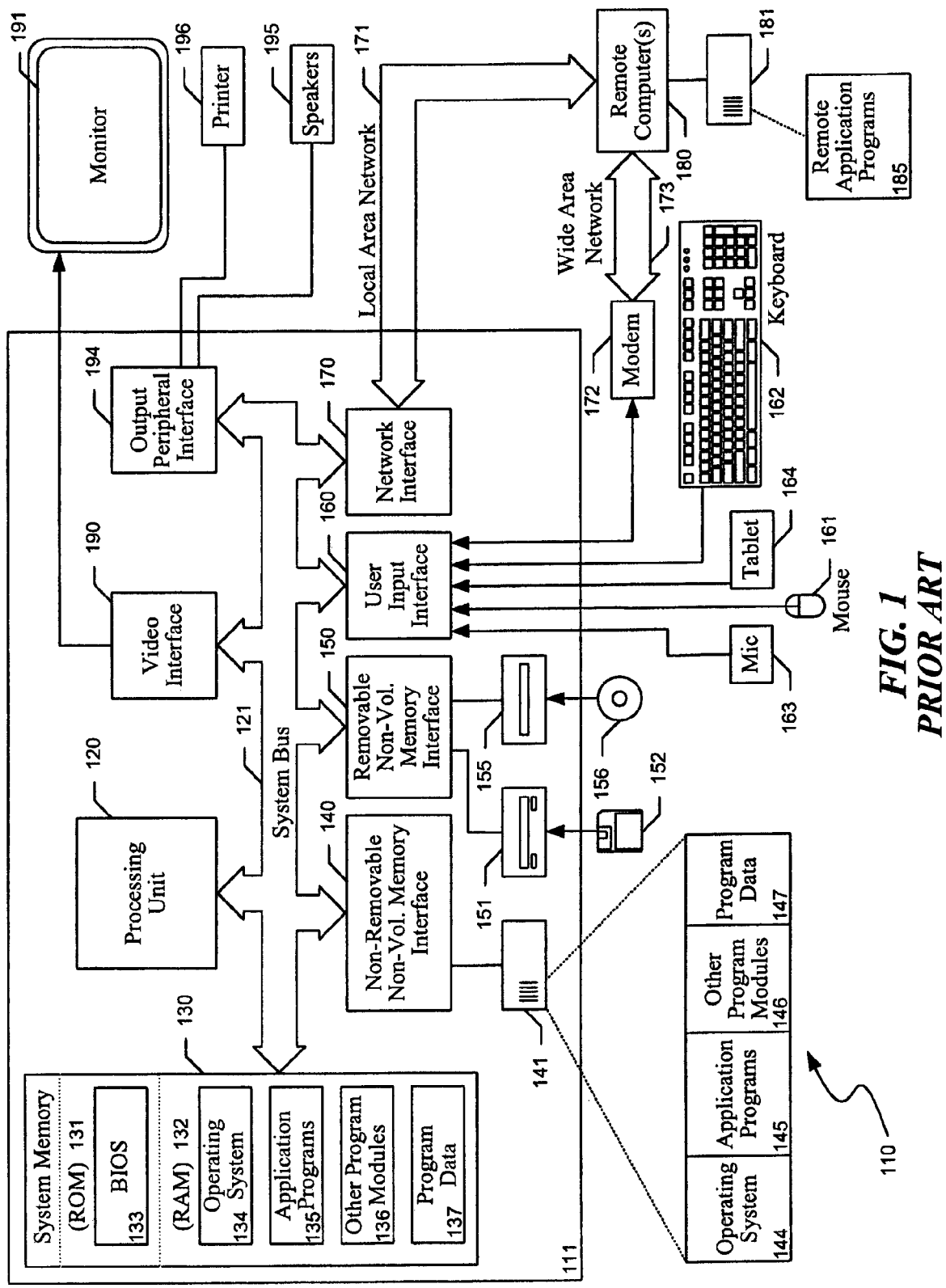
FIG. 1 is a block diagram illustrating an example of a suitable computing system environment in which the techniques may be implemented.

Turning now to the figures, FIG. 1 illustrates an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 111 typically includes a variety of computer-readable media. Computer-readable media can be any available media that can be accessed by the computer 111 and includes both volatile and nonvolatile media and removable and nonremovable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136 and program data 137.

The computer 111 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 111. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162 and pointing device 161, commonly referred to as a mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch screen panel can be physically coupled to a housing in which the computer 111 is incorporated, such as in a tablet-type personal computer. In addition, computing devices such as the computer 111 may also include other peripheral output devices such as speakers 195 and printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
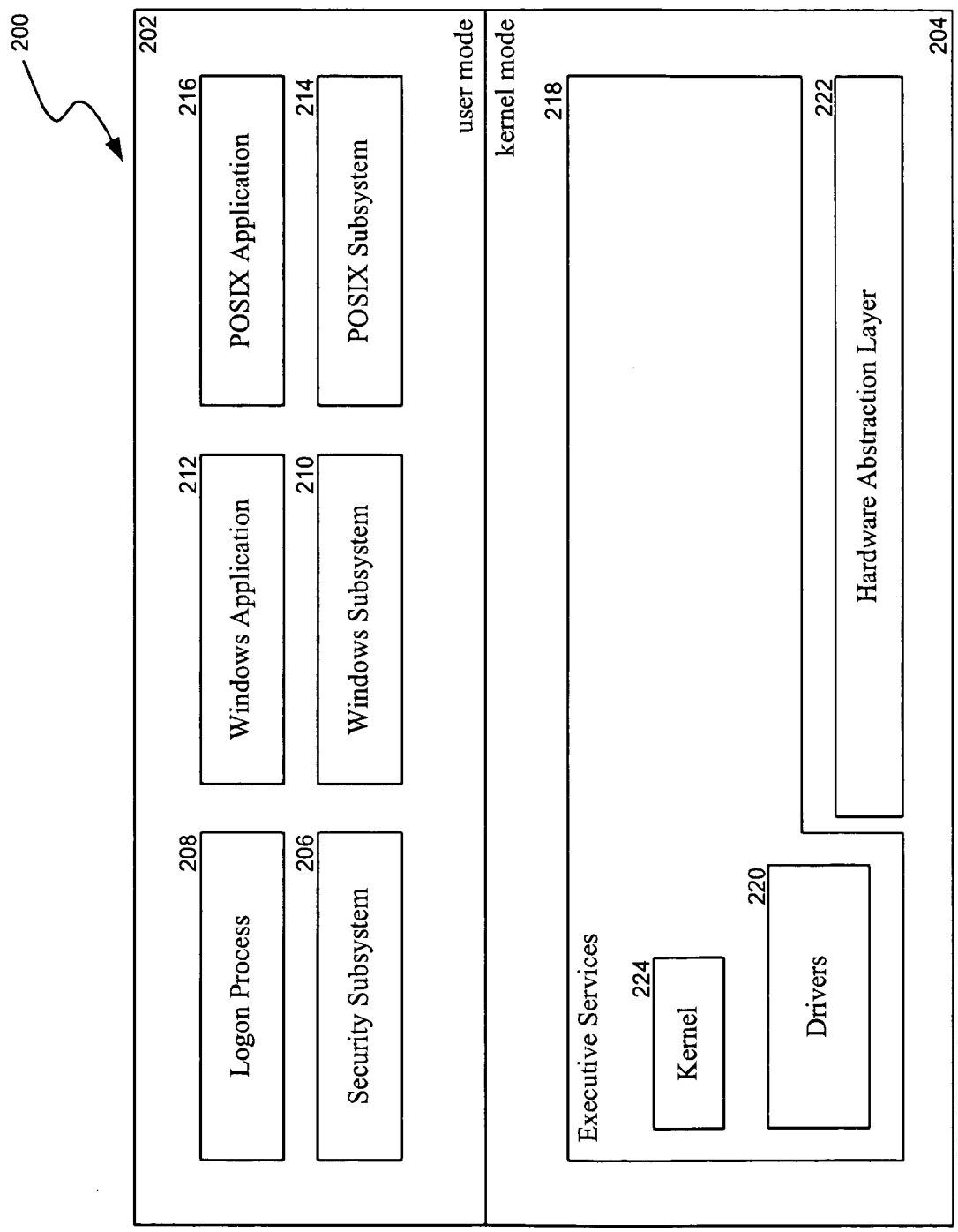
FIG. 2 is a block diagram illustrating components of an operating system.

FIG. 2 is a block diagram illustrating components of an operating system. The operating system 200 comprises multiple components operating in a user mode 202 and a kernel mode 204.

Components operating in a user mode include, e.g., a security subsystem 206, logon process 208, WINDOWS subsystem 210, WINDOWS application 212, POSIX subsystem 214, and POSIX application 216.

The security subsystem provides security services to applications and the operating system. As an example, the security subsystem may provide a logon process 208 and functionality to enable users to log on to the operating system.

The WINDOWS subsystem may provide MICROSOFT WINDOWS functionality to applications, such as WINDOWS applications. The WINDOWS subsystem may implement an application program interface relating to the MICROSOFT WINDOWS operating system. As an example, the WINDOWS subsystem may receive a request made by a WINDOWS application to an API of the WINDOWS subsystem, perform some activities relating to the request, and call an operating system kernel to perform remaining activities.

The operating system may also have additional subsystems, such as a POSIX subsystem 214. The POSIX subsystem may implement an API relating to an operating system that complies with a POSIX specification. The API may be used by a POSIX application 216 to communicate with the POSIX operating system to perform tasks.

As illustrated in FIG. 2, operating system subsystems generally execute in user mode.

When an operating system comprises multiple subsystems, it is capable of providing multiple varieties of operating systems, such as MICROSOFT WINDOWS and POSIX. Thus, applications designed for these varieties of operating systems may function on the operating system comprising multiple subsystems.

The subsystems may utilize services provided by an executive services component 218 operating in kernel mode 204. The executive services component may comprise additional components, such as drivers 220 and a kernel 224. The drivers may provide direct communications between various software and hardware components of the system. As an example, a driver may provide communications between software components and a network interface card. The kernel may provide core operating system functions and communications with a processor. As an example, the kernel may schedule thread execution by loading program registers and instructing the processor to begin executing a thread. A hardware abstraction layer 222 may also operate in kernel mode to provide operating system components and interfaces relating to hardware devices. The hardware abstraction layer may enable software components of the operating system to avoid having to provide functionality specific to a particular vendor's hardware device.

Although applications are shown as a part of the operating system, they may execute by utilizing various facilities provided by the operating system, as illustrated in FIG. 1.

Figure 3:
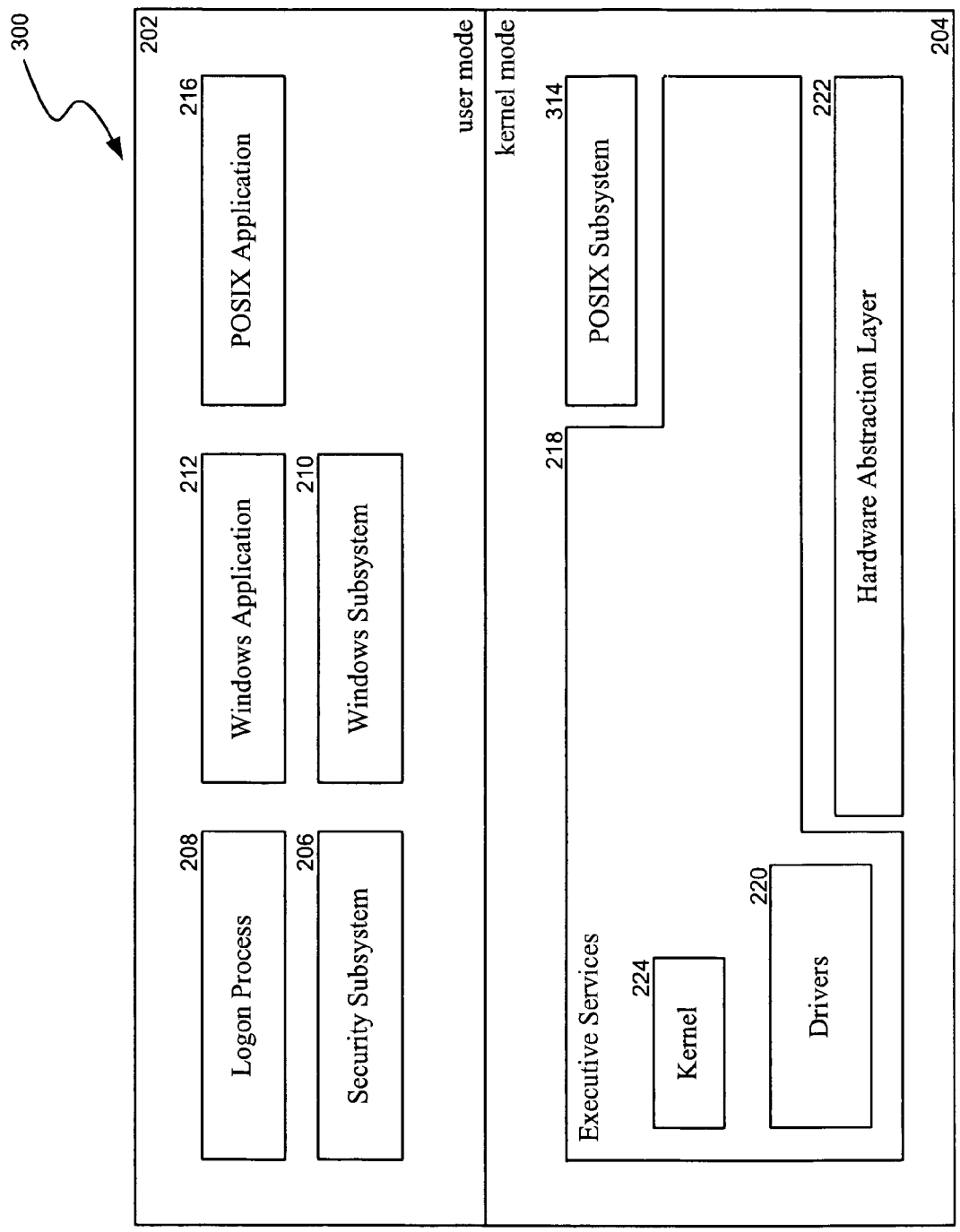
FIG. 3 is a block diagram illustrating components of an operating system having a subsystem operating in kernel mode in an embodiment.
Figure 4:
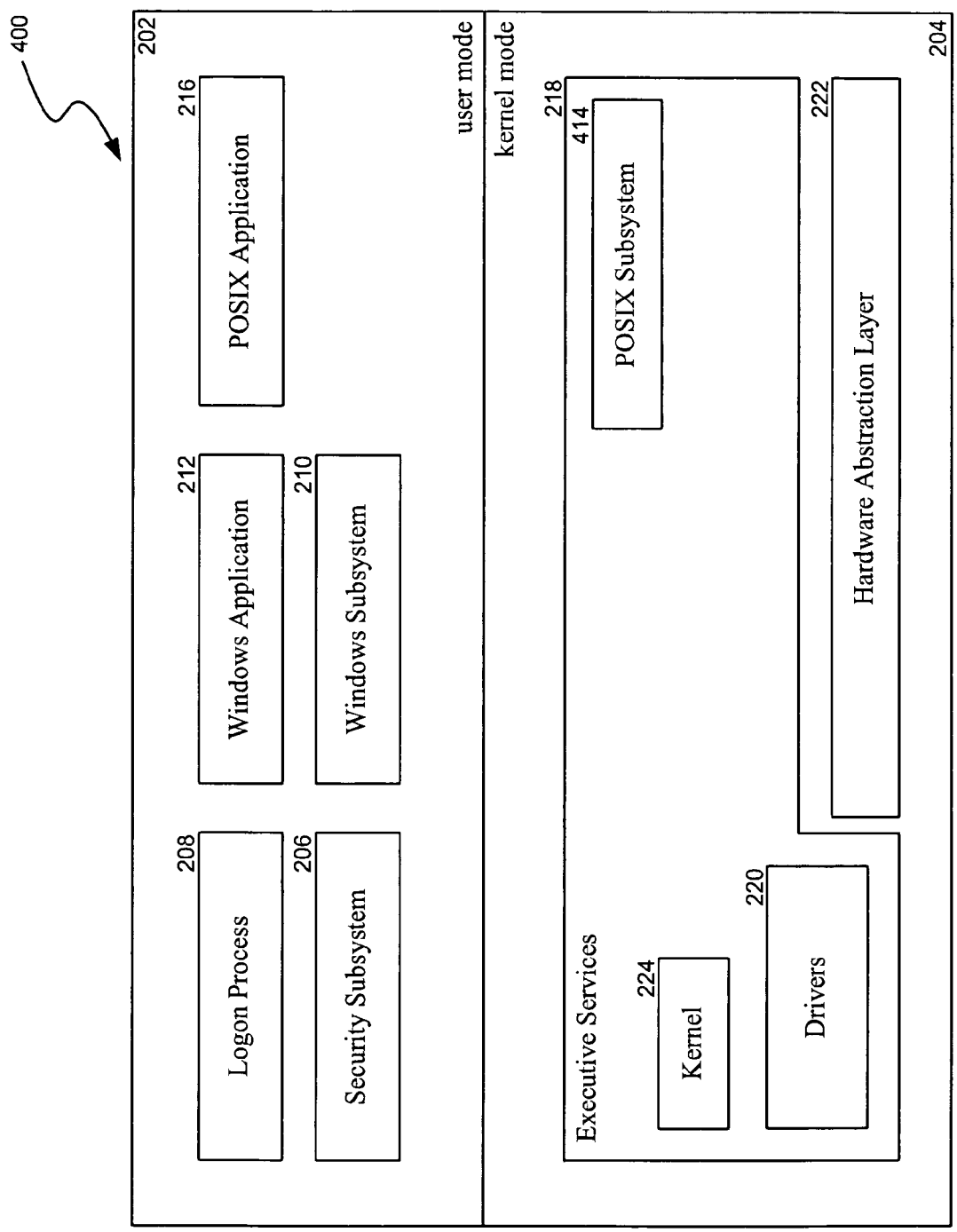
FIG. 4 is a block diagram illustrating components of an operating system having a subsystem as a component of an executive services component in an embodiment.
Figure 5:
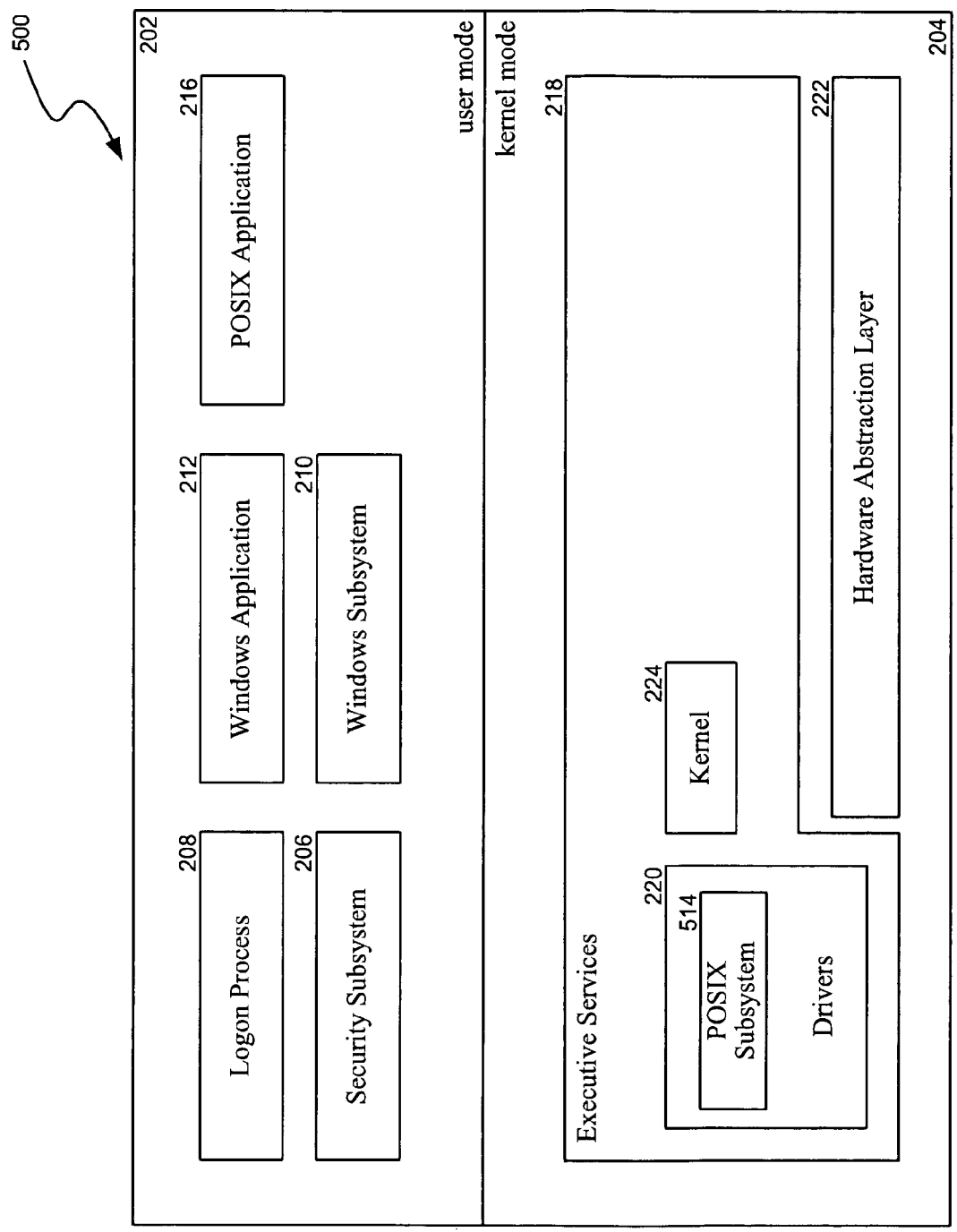
FIG. 5 is a block diagram illustrating components of an operating system having a subsystem as a kernel mode driver in an embodiment.

FIGS. 3-5 illustrate various embodiments of the applicants' technique. In these embodiments, the subsystem provides similar, if not identical, functionality to the subsystem illustrated in FIG. 2. However, these embodiments may improve performance of applications utilizing the subsystem by reducing various context switches.

FIG. 3 is a block diagram illustrating components of an operating system having a subsystem operating in kernel mode in an embodiment. In various embodiments, the POSIX subsystem 314 may operate in kernel mode without being a part of the executive services. However, the POSIX subsystem would utilize services provided by components of the executive services. As an example, the POSIX subsystem would utilize services provided by the kernel.

The operating system 300 is similar to the operating system 200, described above in relation to FIG. 2. However, a notable difference between the operating system of FIG. 3 and that of FIG. 2 is that a POSIX subsystem 314 operates in kernel mode instead of user mode.

By operating in kernel mode, the POSIX subsystem may provide superior performance than when operating in user mode, because the POSIX subsystem's calls to various components of the executive services, such as the kernel, would not require a context switch from user mode to kernel mode. Thus, although calls from POSIX applications to the POSIX subsystem would involve a context switch from user mode to kernel mode, further context switches from user mode to kernel mode (or vice versa) are avoided when the subsystem calls functions of the executive services, such as those provided by the kernel. Furthermore, inter-process or inter-thread context switches from the application to the subsystem would be avoided.

FIG. 4 is a block diagram illustrating components of an operating system having a subsystem as a component of an executive services component in an embodiment. In the illustrated embodiment, the POSIX subsystem 414 is a component of the executive services. As a component of the executive services, the POSIX subsystem may have a closer integration with other components of the executive services, and accordingly may perform better in some respects than embodiments described above in relation to FIG. 3.

Kernel mode drivers are treated as a part of the operating system and have access to the operating system's address space.

FIG. 5 is a block diagram illustrating components of an operating system having a subsystem as a kernel mode driver in an embodiment. When implemented as a kernel mode driver, the POSIX subsystem 514 may have superior access to executive services, hardware, other drivers, and other aspects of the executive services. Accordingly, the POSIX subsystem may offer superior performance in some respects than that described above in relations to FIGS. 3 and 4. Furthermore, adding drivers to an operating system may not involve modifications to the operating system itself. As a result, this embodiment may involve a reduced overall engineering effort.

Thus, in the embodiments illustrated in FIGS. 3-5, operating system performance may be improved because fewer inter-process, inter-thread, or user mode to kernel mode context switches may be required when an application makes an operating system call that is implemented by a subsystem operating in kernel mode.

Figure 6:
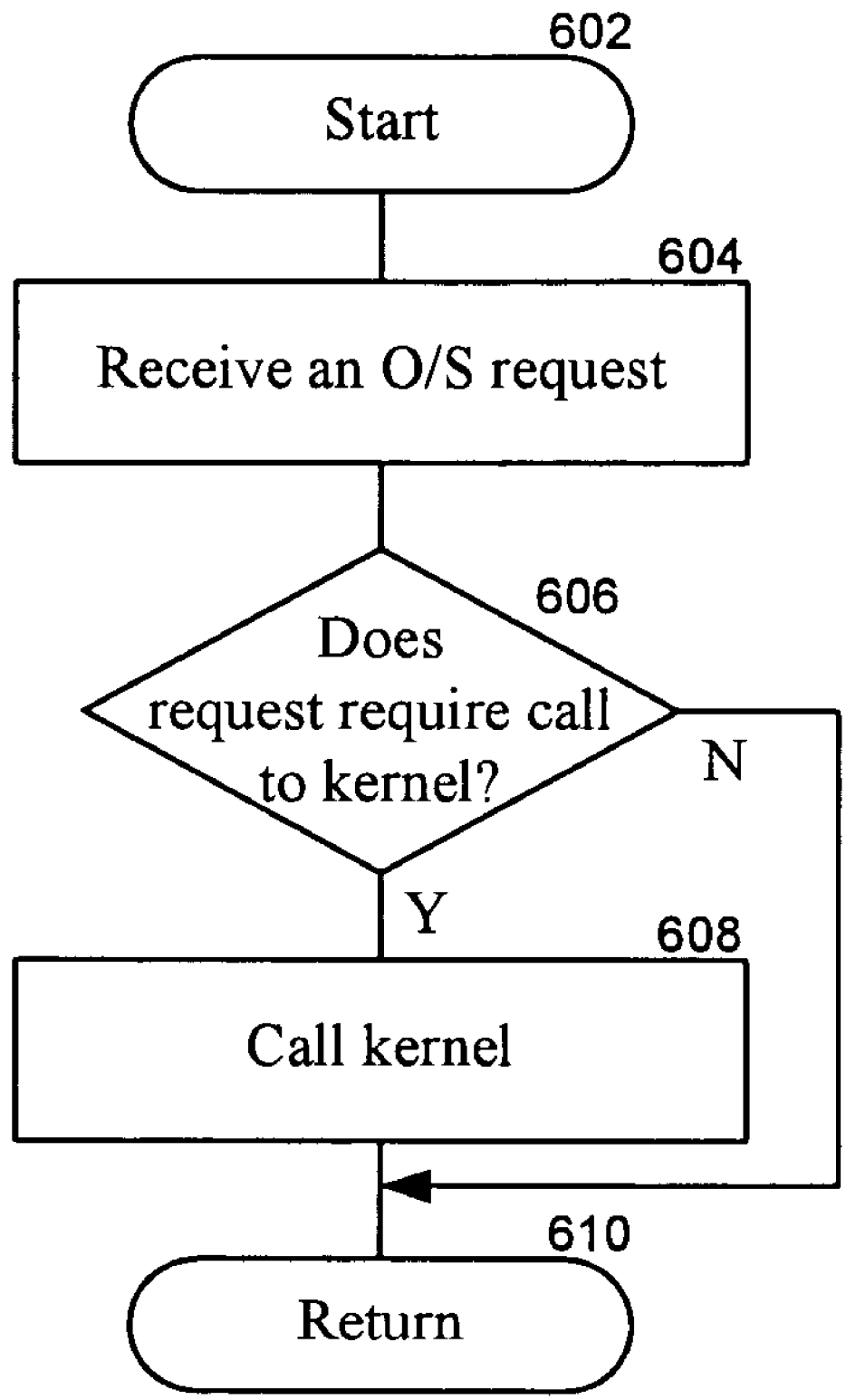
FIG. 6 is a flow diagram illustrating a routine performed by a subsystem operating in kernel mode.

FIG. 6 is a flow diagram illustrating a routine performed by a subsystem operating in kernel mode. The routine begins at block 602.

At block 604, the routine receives an operating system request. The routine may receive the operating system request from a variety of components, such as an application program or other operating system components.

At block 606, the routine determines whether the request requires a call to a kernel. The operating system request may not require a call to a kernel when, e.g., the subsystem is capable of performing the request entirely on its own, or in collaboration with other objects of the operating system. However, many requests may require one or more calls to the kernel. As an example, an inter-thread communication may be performed by using the kernel. If the request requires a call to the kernel, the routine continues at block 608. Otherwise, the routine continues at block 610.

At block 608, the routine calls the kernel. The routine may provide information relating to the call, such as registers.

At block 610, the routine returns to its caller.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for improving performance of an operating system, comprising:
    a processor and memory;
    a subsystem that is implemented as a kernel mode driver and is configured to operate in a kernel mode of an operating system, the subsystem for receiving and processing requests for an operating system function from an operating system component, wherein the subsystem implements an application program interface of the operating system and complies with a portable operating system interface specification; and
    a kernel for receiving and processing function calls from the subsystem, the subsystem invoking the function calls to perform the requests, the function calls occurring in the kernel mode without causing a context switch from a user mode of the operating system.

2. The system of claim 1 wherein the operating system component is an application program.

3. The system of claim 1 wherein the operating system component operates in the user mode.

4. The system of claim 1 wherein the operating system component operates in the kernel mode.

5. A method performed by a subsystem for improving performance of an operating system, the subsystem operating in a kernel mode of the operating system, the method comprising:
    receiving a request for an operating system function from an operating system component;
    invoking a first function provided by the subsystem to perform a first portion of the request, the invoking causing a first context switch from a user mode to the kernel mode; and
    calling a second function to perform a second portion of the request, the calling occurring in the kernel mode without causing a second context switch from the user mode to the kernel mode, wherein the first function and the second function are both provided by an executive services component that operates in the kernel mode and the subsystem is implemented as a kernel mode driver that operates within the executive services component, wherein the subsystem implements an application program interface of the operating system and is fully compliant with a portable operating system interface specification.

6. The method of claim 5 wherein the operating system component is an application program.

7. The method of claim 5 wherein the operating system component operates in the kernel mode.

8. A computer-readable storage medium storing computer-executable instructions for performing a method implemented by a subsystem operating in kernel mode of an operating system, the computer-executable instructions when executed by a processor, cause the processor to perform the method comprising:
    receiving a request for an operating system function from an application operating in a user mode of the operating system;
    invoking a first function provided by the subsystem to perform a first portion of the request, the invoking causing a first context switch from the user mode to the kernel mode; and
    calling a second function to perform a second portion of the request, the calling occurring in the kernel mode without causing a second context switch from the user mode to the kernel mode, wherein the first function and the second function are both provided by an executive services component that operates in the kernel mode and the subsystem is implemented as a kernel mode driver that operates within the executive services component, wherein the subsystem implements an application program interface of the operating system and is fully compliant with a portable operating system interface specification.

* * * * *